US009132362B2

(12) United States Patent
Keyser

(10) Patent No.: US 9,132,362 B2
(45) Date of Patent: Sep. 15, 2015

(54) SOLVENT EXTRACTION MIXER SETTLER APPARATUS

(71) Applicant: FLSmidth A/S, Valby (DK)

(72) Inventor: Paul Keyser, Bethlehem, PA (US)

(73) Assignee: FLSMIDTH A/S (DK)

( * ) Notice: Subject to any disclaimer, the term of this patent is extended or adjusted under 35 U.S.C. 154(b) by 0 days.

(21) Appl. No.: 14/368,811

(22) PCT Filed: Dec. 13, 2012

(86) PCT No.: PCT/US2012/069344
§ 371 (c)(1),
(2) Date: Jun. 26, 2014

(87) PCT Pub. No.: WO2013/101474
PCT Pub. Date: Jul. 4, 2013

(65) Prior Publication Data
US 2014/0374349 A1    Dec. 25, 2014

Related U.S. Application Data

(60) Provisional application No. 61/580,760, filed on Dec. 28, 2011.

(51) Int. Cl.
*B01D 11/04* (2006.01)
*B01D 21/24* (2006.01)
(Continued)

(52) U.S. Cl.
CPC ............ *B01D 11/04* (2013.01); *B01D 11/0446* (2013.01); *B01D 11/0484* (2013.01); *B01D21/003* (2013.01); *B01D 21/0039* (2013.01); *B01D 21/2444* (2013.01); *C02F 1/26* (2013.01); *B01D 2011/005* (2013.01)

(58) Field of Classification Search
CPC ............... B01D 11/04; B01D 11/0446; B01D 2011/005; B01D 21/10; B01D 21/003; B01D 21/24; B01D 21/2444; B01D 21/30; C02F 1/26; C02F 1/40
USPC ........... 210/97, 143, 194, 511, 519, 521, 522, 210/532.1, 538, 540, 634, 801, 802, 804, 210/805, 806; 422/256–259
See application file for complete search history.

(56) References Cited

U.S. PATENT DOCUMENTS 2,094,909 A * 10/1937 Baily et al. .................... 210/199
3,989,467 A * 11/1976 Paige ............................ 422/257
(Continued)

OTHER PUBLICATIONS

The International Search Report and Written Opinion dated Feb. 22, 2013, 9 pages.

*Primary Examiner* — Joseph Drodge
(74) *Attorney, Agent, or Firm* — Jeffrey A. Sharp; Aaron M. Pile; Daniel DeJoseph

(57) ABSTRACT

A mixer settler [1] comprises a settling tank [30], an organic launder [40] provided within the settling tank [30], an aqueous launder [50] provided within the settling tank [30], and an isolated aqueous weir box [70] which is positioned internally or externally relative to an outer profile of the mixer settler [1], the isolated aqueous weir box [70] being at least partially operatively isolated from the settling tank [30] by the aqueous launder [50]. The isolated aqueous weir box [70] comprises an adjustable weir [76] which separates a recycle chamber [72] from an advance chamber [74] therein. The organic launder [40] is operably connected to an organic advance effluent pipe [80], and the aqueous launder [50] is operably connected to the isolated aqueous weir box [70]. The organic launder [40] may be operably connected to an isolated organic weir box [60] which is separate from the isolated aqueous weir box [70], and may further comprise an adjustable weir [66] which separates a collection chamber [62] from an advance chamber [64]. Also disclosed, is a kit for modifying or fabricating a mixer settler [1], as well as a solvent extraction process.

24 Claims, 8 Drawing Sheets

(51) Int. Cl.
   *B01D 21/30* (2006.01)
   *C02F 1/26* (2006.01)
   *B01D 21/00* (2006.01)
   *B01D 11/00* (2006.01)

(56) References Cited

U.S. PATENT DOCUMENTS

| | | | | |
|---|---|---|---|---|
| 4,188,361 A * | 2/1980 | Rowden | ............................ | 423/9 |
| 4,218,311 A * | 8/1980 | Newrick | ....................... | 210/644 |
| 4,277,445 A * | 7/1981 | De Schepper et al. | ........ | 422/259 |
| 4,338,285 A * | 7/1982 | Eberts | ........................... | 422/257 |
| 4,391,711 A * | 7/1983 | Jackson et al. | ................ | 210/634 |
| 4,545,892 A * | 10/1985 | Cymbalisty et al. | .......... | 208/391 |
| 5,662,861 A * | 9/1997 | Taylor | ........................... | 266/170 |
| 6,083,400 A * | 7/2000 | Nyman et al. | ................. | 210/634 |
| 6,099,732 A * | 8/2000 | Dorlac | .......................... | 210/634 |
| 8,020,710 B2 * | 9/2011 | Nyman et al. | ................. | 210/511 |
| 2006/0131233 A1* | 6/2006 | Gigas et al. | .................... | 210/634 |
| 2010/0051548 A1* | 3/2010 | Dorlac et al. | ................... | 210/638 |

* cited by examiner

SOLVENT EXTRACTION MIXER SETTLER APPARATUS

CROSS-REFERENCE OF RELATED APPLICATIONS

This application is an international application which claims the benefit of U.S. Provisional Patent Application No. 61/580,760, filed on 28 Dec. 2011.

BACKGROUND OF THE INVENTION

This invention relates to separation processes and equipment, and more particularly to mixer settlers, such as those used in solvent-extraction processes during minerals processing.

Mixer settlers generally comprise two stages. A first stage comprises mixing two immiscible fluids (e.g., an organic phase and an aqueous phase) in one or more mixers to create an dispersion which facilitates mass transfer of a target mineral from one of the phases to the other. A second quiescent settling stage allows the two phases to separate from their suspended state—according to their density. Typically, the second stage utilizes a settling tank largely resembling a pool. A fixed organic overflow weir extends across the entire width of the settling tank and serves to "skim" the very top of the lighter organic phase. An adjustable aqueous weir also extends across the entire width of the settling tank to collect the heavier aqueous phase. The adjustable aqueous weir also enables control of operating level within the settler. A shortcoming of such mixer settler designs is that because the width of the settler and, therefore, the length of the adjustable aqueous weir along the width of the settling tank in part, determines the total capacity of the mixer settler, adjustable aqueous weirs have become increasingly large and complex. Large adjustable weirs are cumbersome and demonstrate problems when adjusting their level along the width of the settling tank. Moreover, adjusting the positional height of the adjustable weir must be performed at several discrete locations (i.e., "points of adjustment") along the width of the settling tank (refer to FIG. 13). Therefore, simple, fast, fine-tuned adjustments during a separation process are often difficult. Additionally, "overflow", which passes over conventional organic and aqueous weirs is very turbulent and can readily entrain air and promote formation of undesirable impurities in the system.

FIGS. 12 and 13 illustrate respective side and top views of one example of a conventional mixer settler. A primary mixer and one or more auxiliary mixers are provided—the primary mixer serves to initially mix an organic feed with an aqueous feed which both enter through a false bottom in the primary mixer and provide the motive force for advancing the resulting dispersion. The one or more auxiliary mixers may be utilized in order to provide adequate residence time for the suspension to affect the mass transfer of a valuable metal from one phase to the other. The suspension then moves to a settling area where a lighter organic phase rises and forms an organic layer, leaving a heavier aqueous layer on the bottom of the settler. The organic fraction may be collected via a fixed organic weir which extends across the entire width of the settler, and then advances to the next stage in the process. The aqueous fraction flows around (e.g., below) the organic weir, and then up and over an adjustable aqueous weir. Fluid flowing over the adjustable aqueous weir may be collected and may either be returned to the primary mixer of the same mixer settler to supplement the aqueous feed or advanced to the next process step. In some instances, a second fixed aqueous weir may be provided downstream of the adjustable aqueous weir, wherein fluid passing over the fixed aqueous weir may be collected and advanced to another stage in the process.

OBJECTS OF THE INVENTION

It is, therefore, an object of the invention to provide a mixer settler apparatus having a single point of adjustment for rapid and accurate control of a separation process and simpler maintenance.

It is also an object of the invention to provide a mixer settler apparatus having a finer amount of adjustability (and/or graduation) in order to maintain precise levels and flow rate.

It is also an object of the invention to provide a mixer settler apparatus which localizes, reduces, or eliminates air entrainment in fluids and allows for better management of air entrainment, thereby reducing the formation of crud and buildup.

It is also an object of the invention to provide a mixer settler apparatus having simpler fabrication and plumbing, as well as a smaller footprint, in order to reduce overall capital and installation costs.

These and many other objects of the invention will be apparent from the drawings and description herein. Although every object of the invention is believed to be attained by at least one embodiment of the invention, there is not necessarily any one embodiment of the invention that achieves all of the objects of the invention.

SUMMARY OF THE INVENTION

A mixer settler may comprise a settling tank, an organic launder provided within the settling tank, an aqueous launder provided within the settling tank, and an isolated aqueous weir box which may be positioned internally or externally relative to an outer profile of the mixer settler, the isolated aqueous weir box being at least partially operatively isolated from the settling tank by the aqueous launder. The organic launder may be operably connected to an organic advance effluent pipe, and the aqueous launder may be preferably positioned lower than the organic launder so as to allow submersion during operation. The aqueous launder may be operably connected to the isolated aqueous weir box, which may comprise an adjustable weir separating a recycle chamber from an advance chamber. The organic launder may also be operably connected to an isolated organic weir box having an adjustable weir separating a collection chamber from an advance chamber. In some embodiments, the organic launder and the aqueous launder may be completely submerged in an organic phase and an aqueous phase, respectively, during operation. In some embodiments, the recycle chamber of the isolated aqueous weir box may be operably connected to a mixer via an outlet port and an aqueous recycle effluent pipe. In some embodiments, the organic launder and the aqueous launder may extend across a width of the settling tank [30]. In some embodiments, at least one of the organic launder and the aqueous launder may comprise a pipe having one or more perforations, apertures, or slits therein. In some embodiments, the organic launder and/or the aqueous launder may comprise a plurality of pipes having one or more perforations, apertures, or slits therein. In some embodiments, the organic launder may comprise a weir and the aqueous launder may comprise a pipe having one or more perforations, apertures, or slits. In some embodiments, the pipe may comprise one or more bends, branches, or tubular cross-sections—including rectangular or box shape cross-sections.

A solvent extraction process is also disclosed. The process involves providing a mixer settler apparatus as described above, mixing an organic phase with an aqueous phase, separating the organic phase from the aqueous phase, capturing the organic phase utilizing the organic launder, and capturing the aqueous phase utilizing the aqueous launder. In some embodiments, the step of capturing the aqueous phase may comprise collecting aqueous phase in a recycle chamber. Aqueous phase collected in the recycle chamber may be recycled by sending the aqueous phase to a mixer via an aqueous recycle effluent pipe. The organic and aqueous phases may be advanced to downstream processes by way of advance effluent pipes. The process may comprise adjusting the adjustable weir at a single location utilizing means for controlling or adjusting.

A system for use with a mixer settler is also provided. The system may comprise a launder having a pipe with one or more perforations, apertures, or slits therein, which may be configured to be mounted to and extend across a width of a settling tank of a mixer settler. The system may further comprise an isolated weir box which may be configured to be positioned externally of the settling tank. The isolated weir box may comprise an inlet port, an outlet port, and an adjustable weir which may separate the isolated weir box into a first chamber and a second chamber. The launder may be configured to communicate with the first chamber of the isolated weir box, and the first chamber of the isolated weir box may be provided with an outlet port which is designed to facilitate recycling fluid captured within the first chamber. The system may form a portion of a retrofit kit which can be used to modify existing mixer settlers.

DETAILED DESCRIPTION OF THE INVENTION

Figure 1:
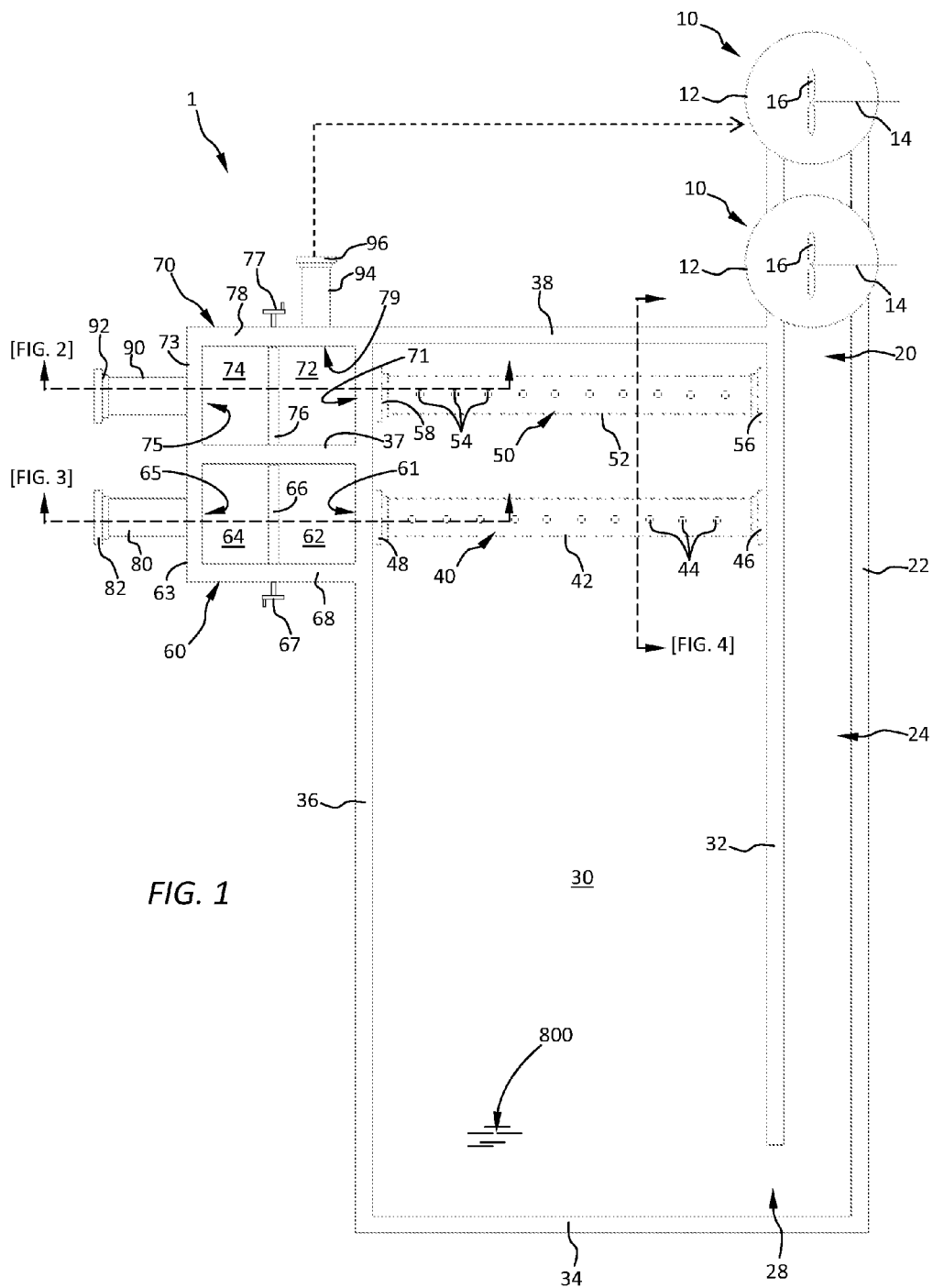
FIG. 1 is top perspective view of a mixer settler according to some embodiments.
Figure 2:
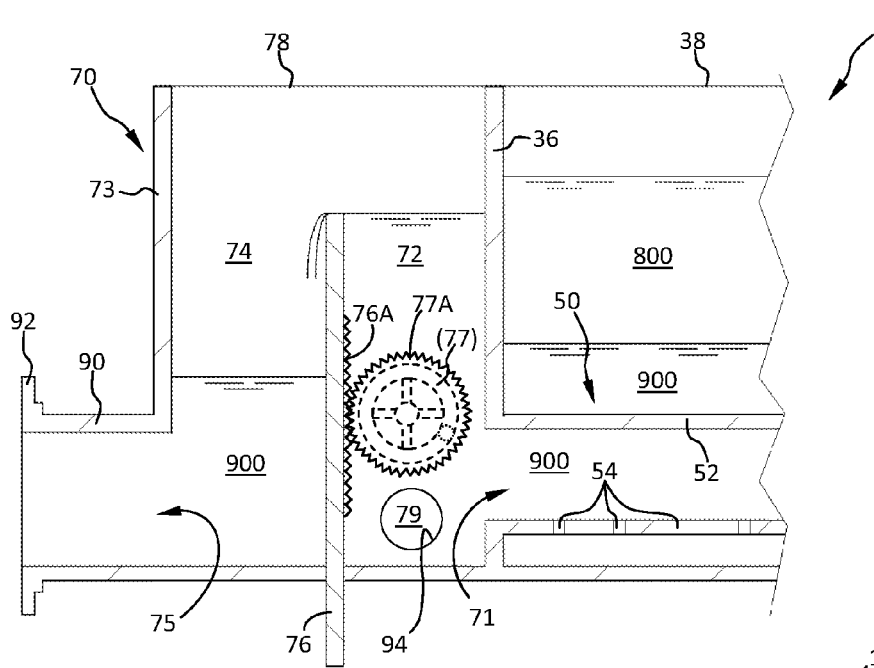
FIG. 2 is a first partial cross-sectional view of FIG. 1.
Figure 3:
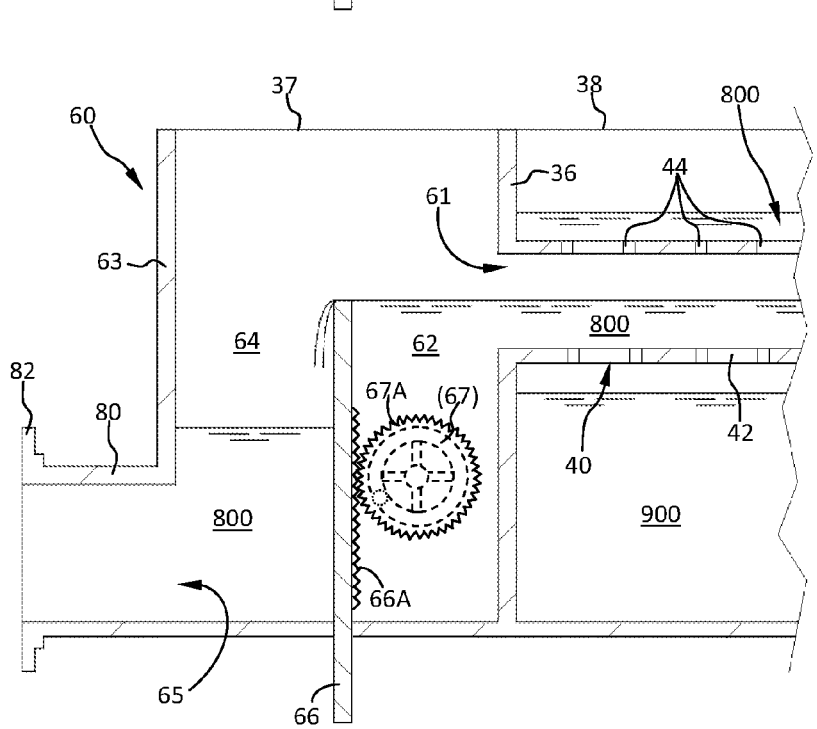
FIG. 3 is a second partial cross-sectional view of FIG. 1.
Figure 4:
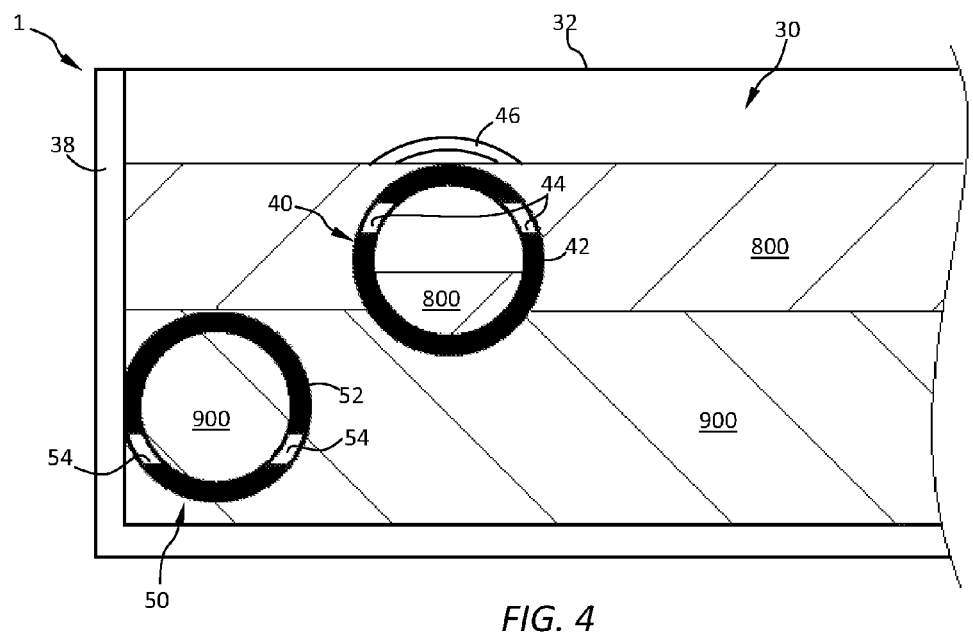
FIG. 4 is a third partial cross-sectional view of FIG. 1.

FIGS. 1-4 show a mixer settler 1 capable of mixing together, and then separating an organic phase 800 from an aqueous phase 900, the mixer setter 1 comprising at least one mixer 10 having a tank 12, an agitator 16, and a drive 14; an inlet 20; a settling tank 30 having a first tank wall 32, a second tank wall 34, a third tank wall 36, and a fourth tank wall 38; an organic launder 40 provided to an upper portion of the settling tank 30 and leading to an isolated organic weir box 60; and an aqueous launder 50 provided to a lower portion of the settling tank 30 and leading to an isolated aqueous weir box 70. The inlet may comprise a channel 24 defined by an inlet sidewall 22 and said first tank wall 32. A threshold 28 existing between channel 24 and settling tank 30 may help reverse flow direction as well as diffuse energy of flows within channel 24. In some instances, one or both of the organic launder 40 and aqueous launder 50 comprise a pipe 42, 52 having one or more perforations, apertures, or slits 44, 54 therein. A first end of each pipe 42, 52, adjacent the first tank wall 32, may be closed off and attached to the first tank wall 32 via a closed side mount 46, 56. A second end of each pipe 42, 52 may comprise an open side mount 48, 58 attached to the third tank wall 36, the open side mounts 48, 58 being open and communicating with said isolated organic weir box 60 and isolated aqueous weir box 70 via inlet ports 61, 71, respectively. In some instances, a valve mechanism for adjusting flow may be provided in or adjacent to inlet ports 61, 71.

Figure 9:
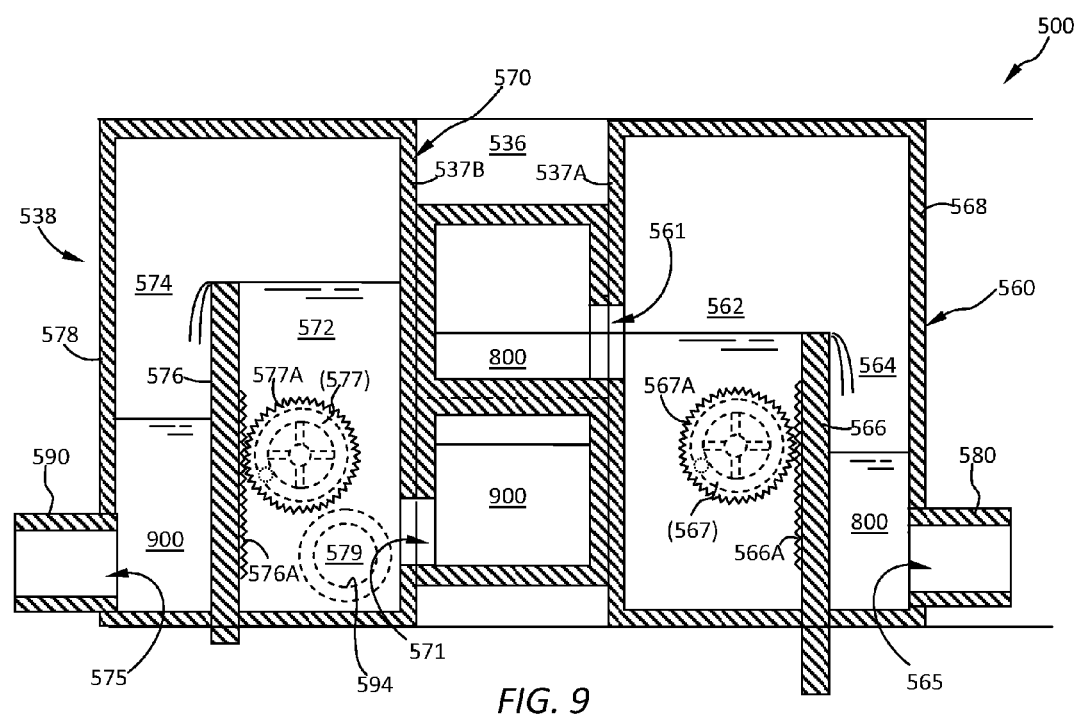
FIG. 9 is an alternate side cross-sectional view of the mixer settler shown in FIG. 8.

Isolated organic weir box 60 and isolated aqueous weir box 70 may be separated by a divider 37, such as a shared wall as shown. As shown in FIG. 9, divider 37 may alternatively comprise two individual walls 537A, 537B separated by a space, rather than a shared wall. Isolated organic weir box 60 comprises a collection chamber 62 and an advance chamber 64 separated by an adjustable weir 66 which is configured to be moved up and down with means for controlling or adjusting 67. Means for controlling or adjusting 67 may comprise, for instance, a complimentary rack 66A and pinion 67A or other arrangement such as a worm gear, mechanical linkage, hydraulic jack, or cam-and-follower arrangement. The isolated organic weir box 60 may be formed by a first wall 63, a second wall 68, and a divider 37 extending from the third wall 36 of the settling tank 30 as shown; however, it may comprise any round, cylindrical, or polyhedral-shaped tank, including prismatic shapes. An outlet port 65 in the advance chamber 64 leads to an organic advance effluent pipe 80 having a flange 82 for connecting to other system components. Fluid 800 exiting the organic advance effluent pipe 80 enters a downstream process. Isolated aqueous weir box 70 comprises a recycle chamber 72 and an advance chamber 74 separated by an adjustable weir 76 which is configured to be moved up and down with means for controlling or adjusting 77. Means for controlling or adjusting 77 may comprise, for instance, a complimentary rack 76A and pinion 77A or other arrangement such as a worm gear mechanism, mechanical linkage, hydraulic jack, or cam-and-follower arrangement. The isolated aqueous weir box 70 may be formed by a first wall 73, a second wall 78, and a divider 37 extending from the third wall 36 of the settling tank 30 as shown; however, it may comprise any round, cylindrical, or polyhedral-shaped tank, including prismatic shapes. An outlet port 75 in the advance chamber 74 leads to an aqueous advance effluent pipe 90 having a flange 92 for connecting to other system components. Fluid 900 exiting the aqueous advance effluent pipe 90 enters a downstream process. An outlet port 79 in the recycle chamber 72 leads to an aqueous recycle effluent pipe 94 having a flange 96 for connecting to other system components. Fluid 900 exiting the aqueous recycle effluent pipe 94 re-enters an upstream process, for instance, supplementing an aqueous feed to mixer 10. In some instances, a valve mechanism for adjusting flow may be provided in or adjacent to outlet ports 65, 75, 79, for example along effluent pipes 80, 90, 94.

Figure 5:
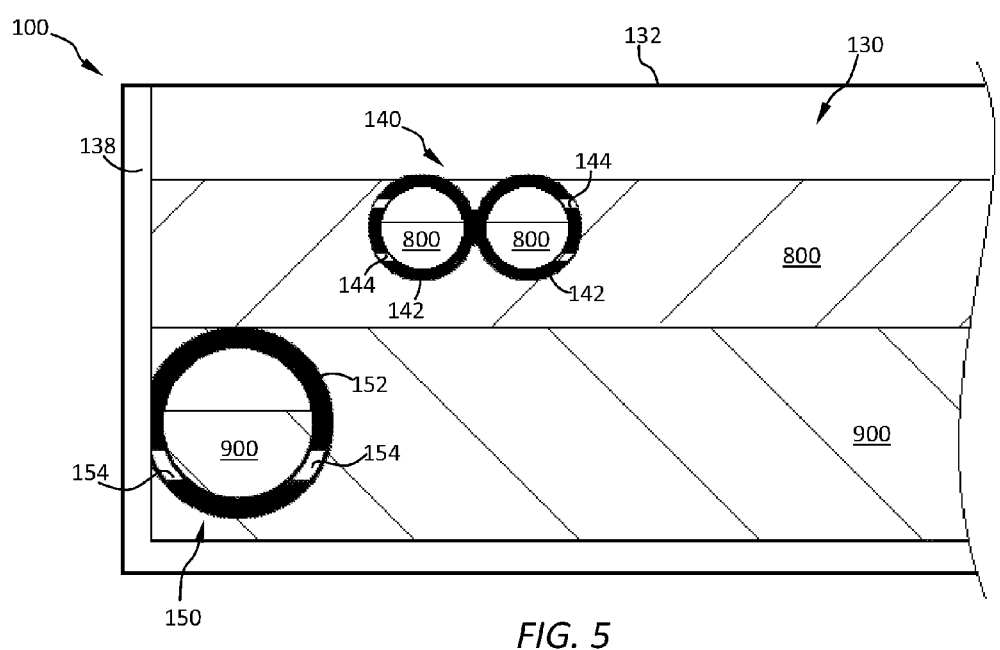
FIG. 5 is a side cross-sectional view of a mixer settler according to other embodiments.
Figure 6:
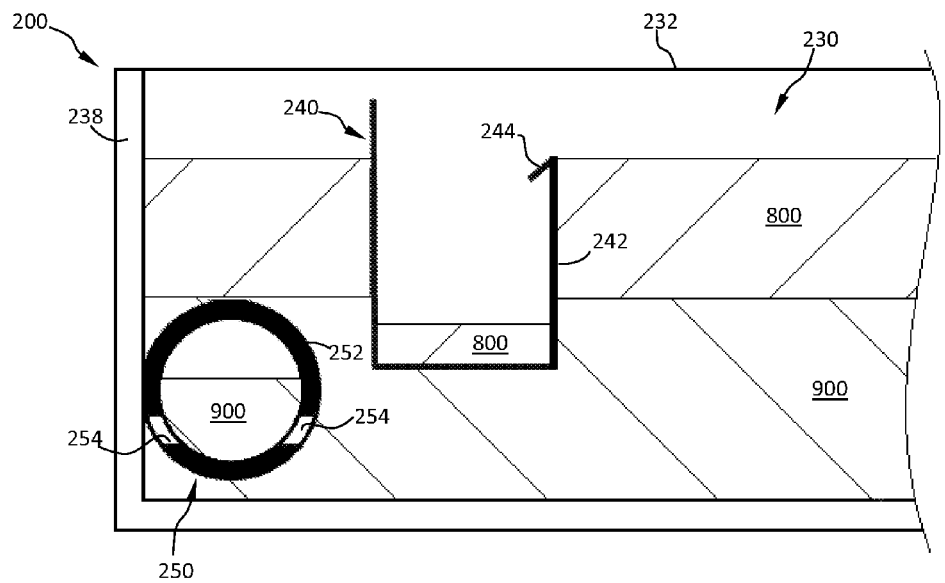
FIG. 6 is a side cross-sectional view of a mixer settler according to yet other embodiments.
Figure 7:
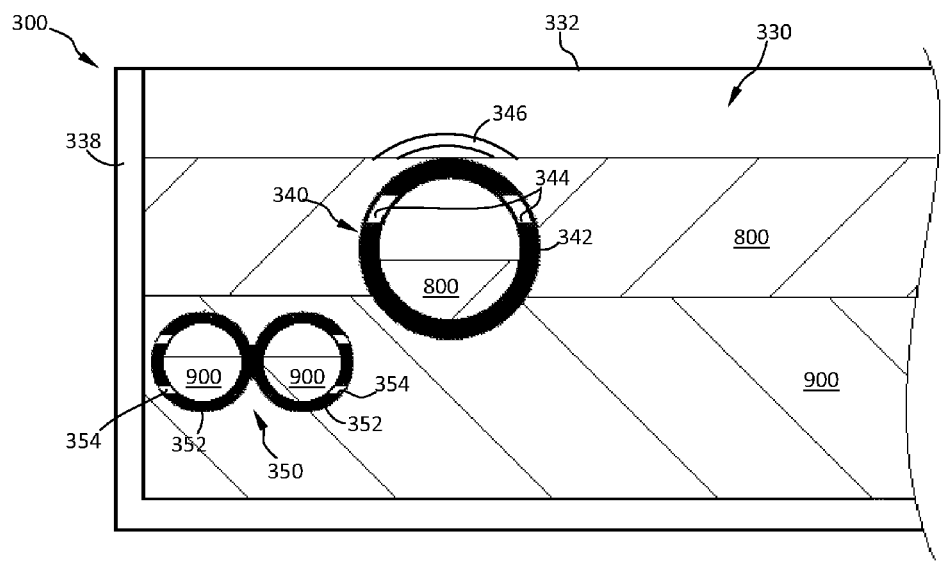
FIG. 7 is a side cross-sectional view of a mixer settler according to even other embodiments.

FIGS. 5-7 show alternative embodiments of the mixer settler 1 shown in FIGS. 1-4. FIG. 5 shows a cross section of a mixer settler 100 comprising an organic launder 140 which comprises a plurality of small diameter pipes 142 having one or more perforations, apertures, or slits 144. The pipes 142 extend across settling tank 130 from a closed side mount 146 proximate a first tank wall 132 to an open side mount adjacent an isolated organic weir box (not shown). Organic phase 800 moves into the organic launder 140 with minimal air entrainment, and follows pipes 142 to the isolated organic weir box. Aqueous phase 900 is removed from the settling tank 130 via an aqueous launder 150 comprising a large diameter pipe 152 having one or more perforations, apertures, or slits 154 therein.

FIG. 6 shows a cross section of a mixer settler 200 comprising an organic launder 240 which comprises a weir 242 having a lip 244 which serves as a spillover. The weir 242 extends across settling tank 230 from a closed end defined by a first tank wall 232 to an open end adjacent an isolated organic weir box (not shown). Organic phase 800 moves into the organic launder 240 with minimal air entrainment, and follows the base of the launder 240 to the isolated organic weir box. Aqueous phase 900 is removed from the settling tank 230 via an aqueous launder 250 comprising a large diameter pipe 252 having one or more perforations, apertures, or slits 254 therein.

FIG. 7 shows a cross section of a mixer settler 300 comprising an organic launder 340 which comprises a large diameter pipe 342 having one or more perforations, apertures, or slits 344. The pipe 342 extends across settling tank 330 from a closed side mount 346 proximate a first tank wall 332 to an open side mount adjacent an isolated organic weir box (not shown). Organic phase 800 moves into the organic launder 340 with minimal air entrainment, and follows pipe 342 to the isolated organic weir box. Aqueous phase 900 is removed from the settling tank 330 via an aqueous launder 350 comprising a plurality of small diameter pipes 352—each having one or more perforations, apertures, or slits 354 therein.

While the aqueous launders 50, 150, 250, 350 are shown to be more proximal to a fourth tank wall 38, 138, 238, 338 than the organic launders 40, 140, 240, 340; said organic launders may be positioned more proximal to the fourth tank wall 38, 138, 238, 338 than the aqueous launders 50, 150, 250, 350, or they may be positioned equally proximal to the fourth tank wall 38, 138, 238, 338. Moreover, while not shown, the organic 40, 140, 240, 340 and aqueous 50, 150, 250, 350 launders may be positioned at substantially the same level of depth within the settling tank 30, 130, 230, 330, wherein the one or more perforations, apertures, or slits 44, 144, 244, 344 of the organic launder are positioned higher (relative to the settling tank) than the one or more perforations, apertures, or slits 44, 144, 244, 344 in the aqueous launder.

Figure 8:
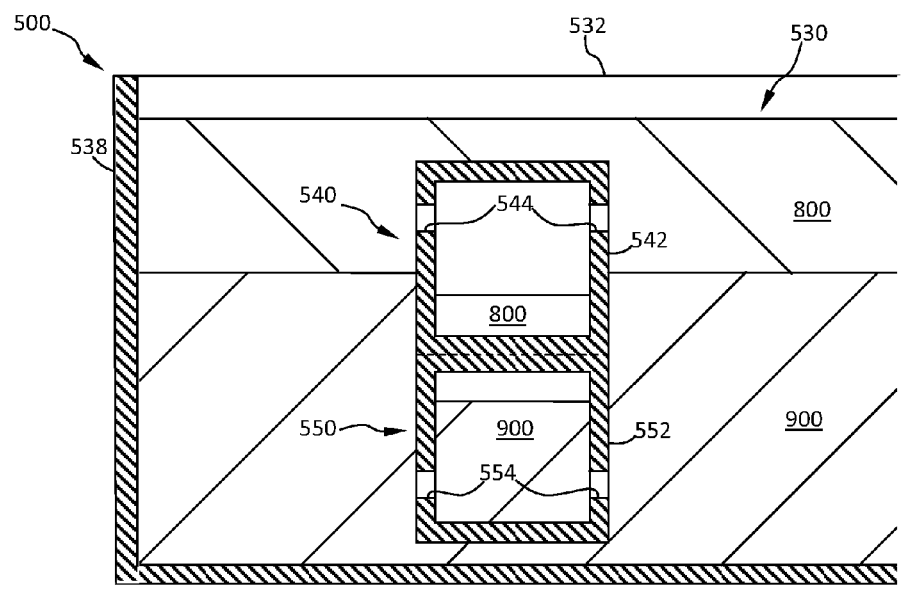
FIG. 8 is a side cross-sectional view of a mixer settler according to other embodiments.

FIGS. 8 and 9 show a mixer settler 500 according to another embodiment, wherein an organic launder 540 and an aqueous launder 550 are provided as one component. The mixer setter 500 comprises a settling tank 530 having a first tank wall 532, a second tank wall (not shown for clarity), a third tank wall 536, and a fourth tank wall 538; an organic launder 540 provided to an upper portion of the settling tank 530 and leading to an isolated organic weir box 560; and an aqueous launder 550 provided to a lower portion of the settling tank 530 and leading to an isolated aqueous weir box 570. In the shown embodiment, both of the organic 540 and aqueous 550 launders comprise at least one pipe 542, 552 having one or more perforations, apertures, or slits 544, 554 therein. The pipes 542, 552 may be extruded together simultaneously as a single monolithic component, or they may be welded, bolted, or otherwise joined together at a shared interface (indicated by dotted line in FIG. 8). While the pipes 542, 552 in FIGS. 8 and 9 are shown as having a rectangular or box-shaped tubular cross-section, and other pipes 42, 52, 142, 152, 252, 342, 352, 442, 452 disclosed herein are shown to be circular or round in cross-section, it should be known that pipes discussed herein may comprise any suitable tubular or semi-tubular cross-sectional shape without limitation. Moreover, while only straight sections are shown, pipes discussed herein may comprise non-linear sections having one or more bends in various directions. A first end of each pipe 542, 552, adjacent the first tank wall 532, may be closed off and attached to the first tank wall 532 via a closed side mount (not shown). Second ends of each pipe 542, 552 are open and communicate with said isolated organic weir box 560 and isolated aqueous weir box 570 via inlet ports 561, 571, respectively. While not shown, said first end of each pipe 542, 552 may be open and communicate with duplicative isolated organic 560 and/or aqueous 570 weir boxes.

Figure 10:
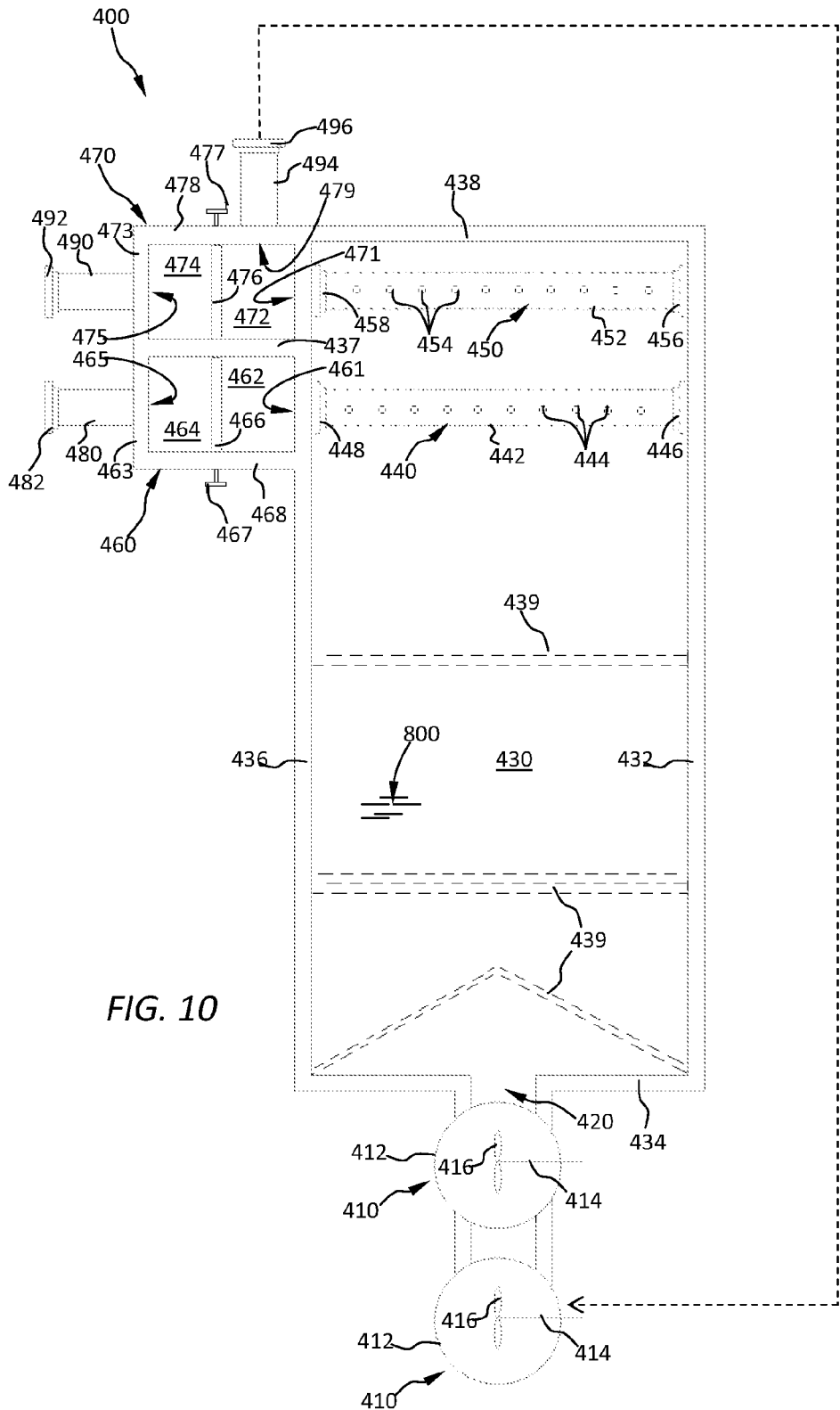
FIG. 10 is a top perspective view of a mixer settler according to some embodiments.

Isolated organic weir box 560 and isolated aqueous weir box 570 may be defined by dividers 537A, 537B, such as separated walls as shown. As shown in FIGS. 1 and 10, dividers 537A, 537B may alternatively comprise a shared wall 37, 437. Isolated organic weir box 560 comprises a collection chamber 562 and an advance chamber 564 separated by an adjustable weir 566 which is configured to be moved up and down with means for controlling or adjusting 567. Means for controlling or adjusting 567 may comprise, for instance, a complimentary rack 566A and pinion 567A or other arrangement such as a worm gear, mechanical linkage, hydraulic jack, or cam-and-follower arrangement. The isolated organic weir box 460 may be formed by a first wall (not shown), a second wall 568, and divider 537A as shown; however, it may comprise any round, cylindrical, or polyhedral-shaped tank, including prismatic shapes. An outlet port 565 in the advance chamber 564 leads to an organic advance effluent pipe 580 having a flange 582 for connecting to other system components. Fluid 800 exiting the organic advance effluent pipe 580 enters a downstream process. Isolated aqueous weir box 570 comprises a recycle chamber 572 and an advance chamber 574 separated by an adjustable weir 576 which is configured to be moved up and down with means for controlling or adjusting 577. Means for controlling or adjusting 577 may comprise, for instance, a complimentary rack 576A and pinion 577A or other arrangement such as a worm gear mechanism, mechanical linkage, hydraulic jack, or cam-and-follower arrangement. The isolated aqueous weir box 570 may be formed by a first wall (not shown), a second wall 578, and divider 537B as shown; however, it may comprise any round, cylindrical, or polyhedral-shaped tank, including prismatic shapes. An outlet port 575 in the advance chamber 574 leads to an aqueous advance effluent pipe 590 for connecting to other system components. Fluid 900 exiting the aqueous advance effluent pipe 590 enters a downstream process. An outlet port 579 in the recycle chamber 572 leads to an aqueous recycle effluent pipe 594 which may be connected to other system components. Fluid 900 exiting the aqueous recycle effluent pipe 594 re-enters an upstream process, for instance, supplementing an aqueous feed to a mixer (not shown).

FIG. 10 shows a mixer settler 400 of the non-reverse flow type, which is capable of mixing together, and then separating an organic phase 800 from an aqueous phase 900. The mixer setter 400 comprises at least one mixer 410 having a tank 412, an agitator 416, and a drive 414; an inlet 420; a settling tank 430 having a first tank wall 432, a second tank wall 434, a third tank wall 436, and a fourth tank wall 438; an organic launder 440 provided to an upper portion of the settling tank 430 and leading to an isolated organic weir box 460; and an aqueous launder 450 provided to a lower portion of the settling tank 430 and leading to an isolated aqueous weir box 470. In some instances, one or both of the organic launder 440 and the aqueous launder 450 comprise a pipe 442, 452 having one or more perforations, apertures, or slits 444, 454 therein. A first end of each pipe 442, 452, adjacent the first tank wall 432, may be closed off and attached to the first tank wall 432 via a closed side mount 446, 456. A second end of each pipe 442, 452 may comprise an open side mount 448, 458 attached to the third tank wall 436—the open side mounts 448, 458 being open and communicating with said isolated organic weir box 460 and isolated aqueous weir box 470 via inlet ports 461, 471, respectively. In some instances, a valve mechanism for adjusting flow may be provided in or adjacent to inlet ports 461, 471.

Isolated organic weir box 460 and isolated aqueous weir box 470 may be separated by a divider 437, such as a shared wall as shown. As shown in FIG. 9, divider 437 may alternatively comprise two individual walls 537A, 537B which are separated by a space, rather than the shared wall depicted in FIG. 10. Isolated organic weir box 460 comprises a collection chamber 462 and an advance chamber 464 separated by an adjustable weir 466 which is configured to be moved up and down with means for controlling or adjusting 467. Means for controlling or adjusting 467 may comprise, for instance, a complimentary rack and pinion or other arrangement such as a worm gear, mechanical linkage, hydraulic jack, or cam-and-follower arrangement. The isolated organic weir box 460 may be formed by a first wall 463, a second wall 468, and a divider 437 extending from the third wall 436 of the settling tank 430 as shown; however, it may comprise any round, cylindrical, or polyhedral-shaped tank, including prismatic shapes. An outlet port 465 in the advance chamber 464 leads to an organic advance effluent pipe 480 having a flange 482 for connecting to other system components. Fluid 800 exiting the organic advance effluent pipe 480 enters a downstream process. Isolated aqueous weir box 470 comprises a recycle chamber 472 and an advance chamber 474 separated by an adjustable weir 476 which is configured to be moved up and down with means for controlling or adjusting 477. Means for controlling or adjusting 477 may comprise, for instance, a complimentary rack and pinion or other arrangement such as a worm gear mechanism, mechanical linkage, hydraulic jack, or cam-and-follower arrangement. The isolated aqueous weir box 470 may be formed by a first wall 473, a second wall 478, and a divider 437 extending from the third wall 436 of the settling tank 430 as shown as shown; however, it may comprise any round, cylindrical, or polyhedral-shaped tank, including prismatic shapes. An outlet port 475 in the advance chamber 474 leads to an aqueous advance effluent pipe 490 having a flange 492 for connecting to other system components. Fluid 900 exiting the aqueous advance effluent pipe 490 enters a downstream process. An outlet port 479 in the recycle chamber 472 leads to an aqueous recycle effluent pipe 494 having a flange 496 for connecting to other system components. Fluid 900 exiting the aqueous recycle effluent pipe 494 re-enters an upstream process, for instance, supplementing an aqueous feed to mixer 410. One or more coalescers 439 such as picket fences may be provided within the settling tank 430, in order to improve efficiency of the mixer settler 400. In some instances, a valve mechanism for adjusting flow may be provided in or adjacent to outlet ports 465, 475, 479, for example along effluent pipes 480, 490, 494.

Figure 11:
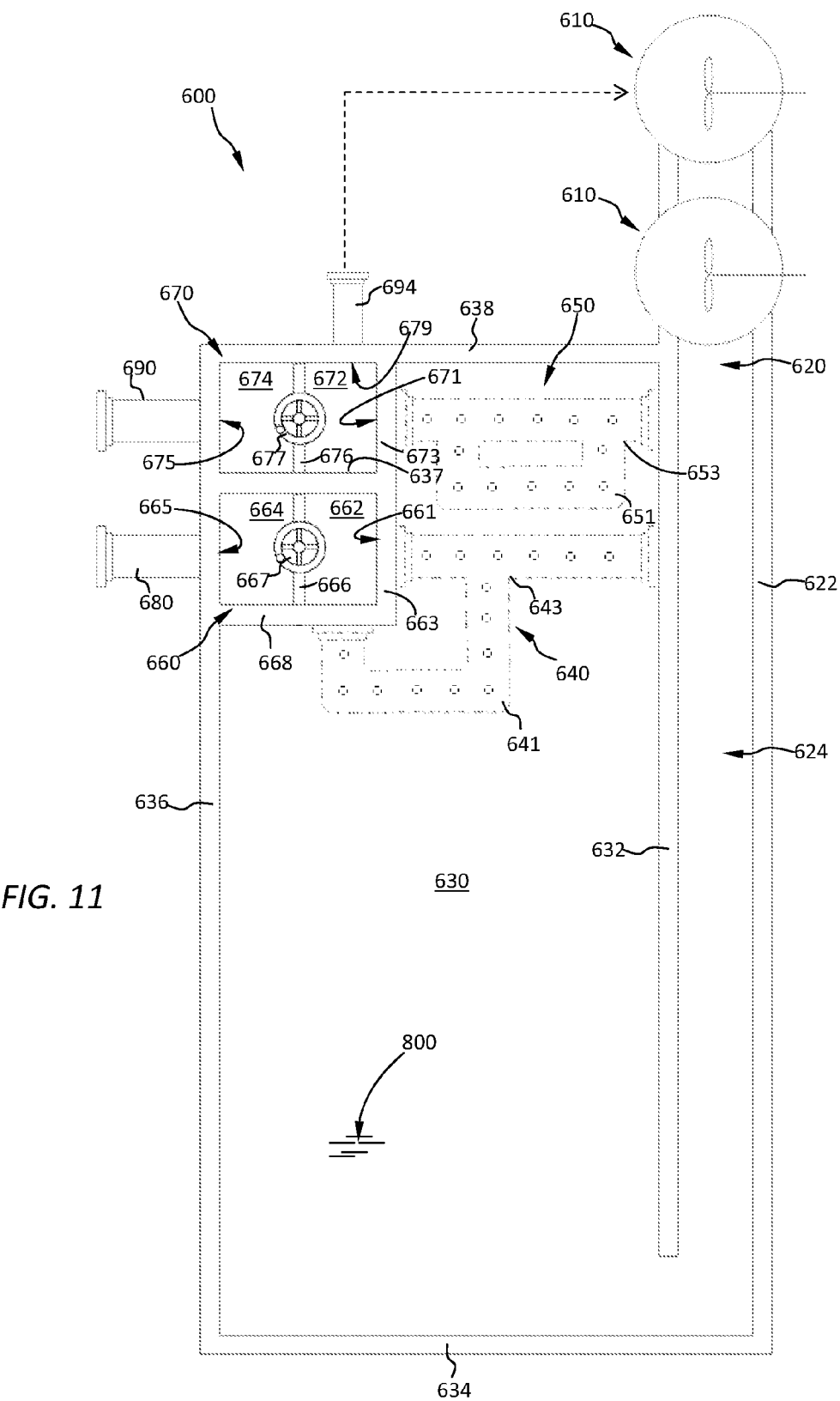
FIG. 11 is a top perspective view of a mixer settler according to other embodiments.
Figure 12:
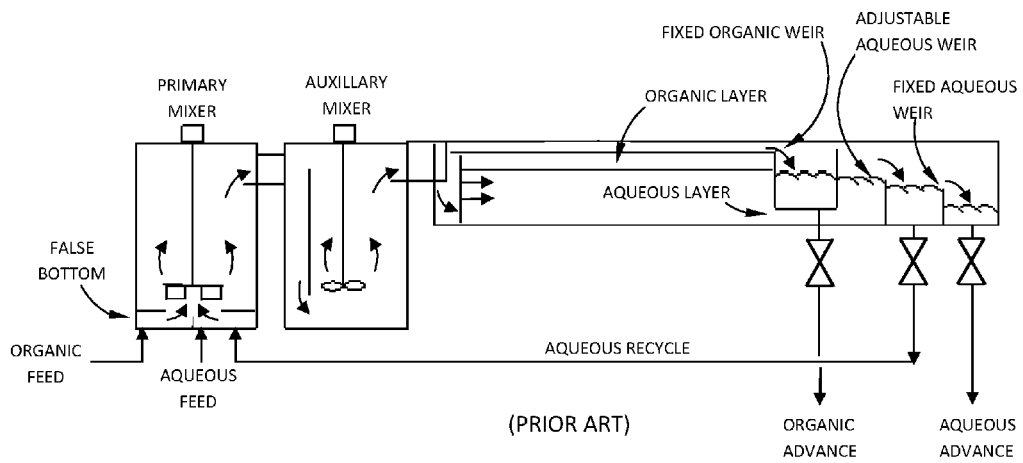
FIGS. 12 and 13 show side and top views of a conventional mixer settler, respectively.
Figure 13:
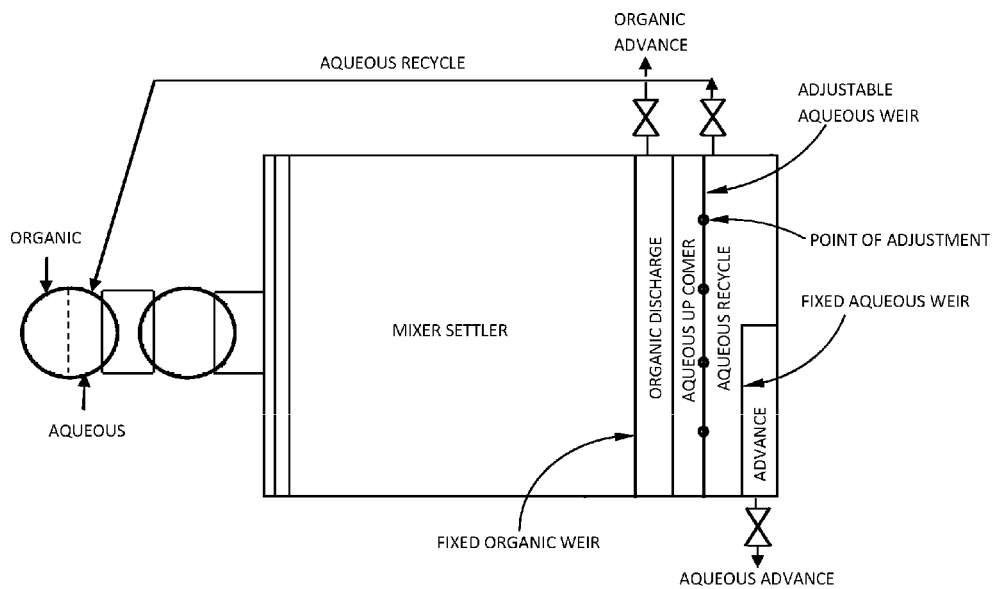

Turning now to FIG. 11, a mixer settler 600 comprises at least one mixer, an inlet 620 leading to a channel 624 defined between a first tank wall 632 and an inlet sidewall 622, a settling tank 630 having a first tank wall 632, a second tank wall 634, a third tank wall 636, and a fourth tank wall 638; an organic launder 640 provided to an upper portion of the settling tank 630 and leading to an isolated organic weir box 660; and an aqueous launder 650 provided to a lower portion of the settling tank 630 and leading to an isolated aqueous weir box 670. In some instances, one or both of the organic launder 640 and the aqueous launder 650 comprise a pipe having one or more perforations, apertures, or slits therein. Pipes may comprise one or more bends 641, 651 or elbows, and/or may comprise one or more branches 643, 653. A first end of each pipe adjacent the first tank wall 632, may be closed off and attached to the first tank wall 632 via a closed side mount as shown. A second end of each pipe may comprise an open side mount attached to a first wall 663, 673 of a respective isolated weir box 660, 670. As shown, the organic launder 640 communicates with said isolated organic weir box 660 and the aqueous launder 650 communicates with said isolated aqueous weir box 670 via inlet ports 661, 671, respectively. In some instances, a valve mechanism for adjusting flow may be provided in or adjacent to inlet ports 661, 671.

Isolated organic weir box 660 and isolated aqueous weir box 670 may be separated by a divider 637, such as a shared wall as shown. As shown in FIG. 11, both the isolated aqueous weir box 670 and isolated organic weir box 660 may extend into an area of the settling tank 630 in order to preserve a uniform external peripheral shape of the mixer settler 600. While not shown, in other embodiments, one of the isolated weir boxes may extend into an area of the settling tank as shown in FIG. 11, and the other of the isolated weir boxes may protrude from an area of the settling tank as shown in FIG. 10. Isolated organic weir box 660 comprises a collection chamber 662 and an advance chamber 664 separated by an adjustable weir 666 which is configured to be moved up and down with means for controlling or adjusting 667. Means for controlling or adjusting 667 may comprise, for instance, a complimentary rack and pinion or other arrangement such as a worm gear, mechanical linkage, hydraulic jack, or cam-and-follower arrangement. The isolated organic weir box 660 may be formed by a first wall 663, a second wall 668, the third tank wall 636, and a divider 637 extending from the third tank wall 636 of the settling tank 630 as shown; however, it may comprise any round, cylindrical, or polyhedral-shaped tank, including prismatic shapes having walls in any number, shape, or configuration. An outlet port 665 in the advance chamber 664 leads to an organic advance effluent pipe 680 for connecting to other system components. Fluid 800 exiting the organic advance effluent pipe 680 enters a downstream process. Isolated aqueous weir box 670 comprises a recycle chamber 672 and an advance chamber 674 separated by an adjustable weir 676 which is configured to be moved up and down with means for controlling or adjusting 677. Means for controlling or adjusting 677 may comprise, for instance, a complimentary rack and pinion or other arrangement such as a worm gear mechanism, mechanical linkage, hydraulic jack, or cam-and-follower arrangement. Means for controlling or adjusting 677 the adjustable weir 676 may be completely or partially independent from the means for controlling or adjusting 667 adjustable weir 666. The isolated aqueous weir box 670 may be formed by a first wall 673, the second tank wall 636, the third tank wall 638, and a divider 637 extending from the third tank wall 636 of the settling tank 630 as shown; however, it may comprise any round, cylindrical, or polyhedral-shaped tank, including prismatic shapes having walls in any number, shape, or configuration. An outlet port 675 in the advance chamber 674 leads to an aqueous advance effluent pipe 690 for connecting to other system components. Fluid 900 exiting the aqueous advance effluent pipe 690 enters a downstream process. An outlet port 679 in the recycle chamber 672 leads to an aqueous recycle effluent pipe 694 for connecting to other system components. Fluid 900 exiting the aqueous recycle effluent pipe 694 re-enters an upstream process, for instance, supplementing an aqueous feed to mixer 610.

A contractor or other entity may provide a mixer settler apparatus, or operate a mixer settler apparatus in whole, or in part, as shown and described. For instance, the contractor may receive a bid request for a project related to designing or operating a mixer settler apparatus, or the contractor may offer to design such a system or a process for a client. The contractor may then provide, for example, any one or more of the devices or features thereof shown and/or described in the embodiments discussed above. The contractor may provide such devices by selling those devices or by offering to sell those devices. The contractor may provide various embodiments that are sized, shaped, and/or otherwise configured to meet the design criteria of a particular client or customer. The contractor may subcontract the fabrication, delivery, sale, or installation of a component of the devices disclosed, or of other devices used to provide said devices. The contractor may also survey a site and design or designate one or more storage areas for stacking the material used to manufacture the devices, or for storing the devices and/or components thereof. The contractor may also maintain, modify, or upgrade the provided devices. The contractor may provide such maintenance or modifications by subcontracting such services or by directly providing those services or components needed for said maintenance or modifications, and in some cases, the contractor may modify a preexisting mixer settler apparatus, or parts thereof with a "retrofit kit" to arrive at a modified mixer settler apparatus comprising one or more method steps, devices, components, or features of the systems and processes discussed herein.

Although the invention has been described in terms of particular embodiments and applications, one of ordinary skill in the art, in light of this teaching, can generate additional embodiments and modifications without departing from the spirit of or exceeding the scope of the claimed.

For instance, while not shown, an isolated organic weir box 60, 460 may be provided in multiples, so as to allow cleaning and/or maintenance of one of the multiple isolated organic weir boxes 60, 460 while the other(s) remains in operation. Similarly, isolated aqueous weir boxes 70, 470 may be provided in multiples, so as to allow cleaning and/or maintenance of one of the multiple aqueous weir boxes 70, 470 while the other(s) remains in operation. Furthermore, an isolated weir box 60, 70, 460, 470 may be non-integrally-formed with a settling tank 30, 430—for example, an isolated weir box 60, 70, 460, 470 may be provided as a separate "bolt-on" or "weld-on" component which may be attached to a side 36, 436 of an existing settling tank 30, 430 using mounting brackets or equivalent means. Alternatively, in situations where there is little room for an isolated weir box 60, 70, 460, 470 along a periphery of a settling tank 30, an isolated organic or aqueous weir box 60, 70, 460, 470 may extend within or be spaced away from a settling tank 30. In such latter embodiments, piping (not shown) may be provided to bridge gaps between an open side mount 48, 58 of a launder 40, 50 and an inlet 61, 71 of a remotely-positioned isolated weir box 60, 70, 460, 470. Alternatively, in such former embodiments, one or more of the isolated organic 560 and aqueous 570 weir boxes may extend inwardly into areas which would otherwise be occupied by the settling tank 530, as shown in FIG. 11, in order to provide a more uniform outer profile of the mixer settler 500.

Moreover, while not shown, in some embodiments, collection chamber 62, 462 may further comprise an organic recycle effluent pipe similar to the aqueous recycle effluent pipe 94, 494. In such an embodiment, a portion of the fluids collected in the collection chamber 62, 462 may be fed back to mixer 10, 410 via gravity or a pump (not shown).

Additionally, while explicitly shown for reverse-flow and non-reverse-flow mixer settlers, features and components of the invention may be equally adapted for use in various types of mixer settlers including, but not limited to: segmented circular mixer settlers, Kermac mixer-settlers, Israeli Mining Industries (IMI) mixer settlers, Lurgi mixer settlers, combined mixer settlers, vertical smooth flow (VSF) mixer settlers, Krebs mixer settlers, and conventional mixer settlers.

Accordingly, it is to be understood that the drawings and descriptions herein are proffered by way of example to facilitate comprehension of the invention and should not be construed to limit the scope thereof.

REFERENCE NUMERAL IDENTIFIERS 1, 100, 200, 300, 400, 500, 600 Mixer settler
10, 410, 610 Mixer
12, 412 Tank
14, 414 Drive
16, 416 Agitator
20, 420, 620 Inlet
22, 622 Inlet sidewall
24, 624 Channel
28 Threshold
30, 130, 230, 330, 430, 530, 630 Settling tank
32, 132, 232, 332, 432, 532, 632 First tank wall
34, 434, 634 Second tank wall
36, 436, 536, 636 Third tank wall
37, 437, 537A, 537B, 637 Divider
38, 138, 238, 338, 438, 538, 638 Fourth tank wall
439 Coalescer
40, 140, 240, 340, 440, 540, 640 Organic launder
641, 651 Pipe bend
42, 142, 342, 442, 542 Pipe
44, 144, 344, 444, 544 Perforations, apertures, or slits
46, 346, 446 Closed side mount
48, 448 Open side mount
50, 150, 250, 350, 450, 550, 650 Aqueous launder
52, 152, 252, 352, 452, 552 Pipe
643, 653 Pipe intersection
54, 154, 254, 354, 454, 554 Perforations, apertures, or slits
56, 456 Closed side mount
58, 458 Open side mount
60, 460, 560, 660 Isolated organic weir box
61, 461, 561, 661 Inlet port
62, 462, 562, 662 Collection chamber
63, 463, 663 First wall
64, 464, 564, 664 Advance chamber
65, 465, 565, 665 Outlet port
66, 466, 566, 666 Adjustable weir
66A, 566A First adjustment component (e.g., worm, gear, pinion, rack, first portion of linkage)
67, 467, 567, 667 Means for controlling or adjusting
67A, 567A Second adjustment component (e.g., gear, worm, rack, pinion, second portion of linkage)
68, 468, 568, 668 Second wall
70, 470, 570, 670 Isolated aqueous weir box
71, 471, 571, 671 Inlet port
72, 472, 572, 672 Recycle chamber
73, 473, 673 First wall
74, 474, 574, 674 Advance chamber
75, 475, 575, 675 Outlet port
76, 476, 576, 676 Adjustable weir 76A, 576A First adjustment component (e.g., worm, gear, pinion, rack, first portion of linkage)
77, 477, 577, 677 Means for controlling or adjusting
77A, 577A Second adjustment component (e.g., gear, worm, rack, pinion, second portion of linkage)
78, 478, 578 Second wall
79, 479, 579, 679 Outlet port
80, 480, 580, 680 Organic advance effluent pipe
82, 482 Flange
90, 490, 590, 690 Aqueous advance effluent pipe
92, 492 Flange
94, 494, 594, 694 Aqueous recycle effluent pipe
96, 496 Flange
242 Weir
244 Lip
800 Organic phase
900 Aqueous phase

What is claimed is:

1. A co-current mixer settler [1] comprising:
    a settling tank [30];
    an organic launder [40] provided within the settling tank [30], the organic launder being operably connected to an organic advance effluent pipe [80] and provided adjacent a distal downstream portion of the settling tank [30]; and,
    an aqueous launder [50] provided within the settling tank [30] and being positioned lower than the organic launder [40] so as to allow submersion during operation, the aqueous launder [50] being operably connected to an isolated aqueous weir box [70] which is positioned internally or externally relative to an outer profile of the mixer settler [1] and which is separated from the settling tank [30] by a wall [36], the isolated aqueous weir box [70] communicating with the settling tank [30] via the aqueous launder [50];
    wherein said isolated aqueous weir box [70] comprises a recycle chamber [72], an advance chamber [74], and an adjustable weir [76] which separates the recycle chamber [72] from the advance chamber [74]; and,
    wherein at least one of the organic launder [40] and the aqueous launder [50] comprises a pipe [42, 52] having one or more perforations, apertures, or slits [44, 54] therein, the pipe [42, 52] having a tubular cross-section mounted to and extending across a width of the settling tank [30].

2. The mixer settler [1] according to claim 1, wherein the organic launder [40] is operably connected to an isolated organic weir box [60], which is separate from the isolated aqueous weir box [70] and which is separated from the settling tank [30] by a wall [36], said isolated organic weir box [60] comprising a collection chamber [62], an advance chamber [64], and an adjustable weir [66] which separates the collection chamber [62] from the advance chamber [64].

3. The mixer settler [1] according to claim 1, wherein the organic launder [40] and the aqueous launder [50] are completely submerged in an organic phase [800] and an aqueous phase [900], respectively, during operation.

4. The mixer settler [1] according to claim 1, wherein the recycle chamber [72] of the isolated aqueous weir box [70] is operably connected to a mixer [10] via an outlet port [79] and an aqueous recycle effluent pipe [94].

5. The mixer settler [1] according to claim 1, wherein the organic launder [40] and the aqueous launder [50] extend across a width of the settling tank [30].

6. The mixer settler [1] according to claim 1, wherein at least one of the organic launder [140] and the aqueous launder [350] comprise a plurality of pipes [142, 352] having one or more perforations, apertures, or slits [144, 354] therein.

7. The mixer settler [1] according to claim 6, wherein the organic launder [240] comprises a weir [242] and the aqueous launder [250] comprises a pipe [252] having one or more perforations, apertures, or slits [254].

8. The mixer settler [1] according to claim 7, wherein said pipe [252] comprises one or more bends [641, 651] or branches [643, 653].

9. The mixer settler [1] according to claim 1, wherein both of the organic launder [40] and the aqueous launder [50] comprise pipes [42, 52] having one or more perforations, apertures, or slits [44, 54] therein.

10. The mixer settler [1] according to claim 1, wherein said tubular cross-section comprises a rectangular or box shape.

11. A solvent extraction process comprising:
    providing a co-current mixer settler apparatus [1] having a settling tank [30]; an organic launder [40] provided within the settling tank [30] adjacent a distal downstream portion of the settling tank [30], the organic launder being operably connected to an organic advance effluent pipe [80]; and, an aqueous launder [50] provided within the settling tank [30], the aqueous launder [50] being operably connected to an isolated aqueous weir box [70] which is positioned internally or externally relative to an outer profile of the mixer settler [1] and which is separated from the settling tank [30] by a wall [36], the isolated aqueous weir box [70] communicating with the settling tank [30] via the aqueous launder [50]; wherein said isolated aqueous weir box [70] comprises a recycle chamber [72], an advance chamber [74], and an adjustable weir [76] which separates the recycle chamber [72] from the advance chamber [74]; and, wherein at least one of the organic launder [40] and the aqueous launder [50] comprises a pipe [42, 52] having one or more perforations, apertures, or slits [44, 54] therein, the pipe [42, 52] having a tubular cross-section mounted to and extending across a width of the settling tank [30];
    mixing an organic phase [800] with an aqueous phase [900];
    separating the organic phase [800] from the aqueous phase [900];
    capturing the organic phase [800] utilizing the organic launder [40]; and
    capturing the aqueous phase [900] utilizing the aqueous launder [50].

12. The solvent extraction process of claim 11, wherein the step of capturing the aqueous phase [900] comprises collecting aqueous phase [900] in the recycle chamber [72].

13. The solvent extraction process of claim 12, further comprising recycling aqueous phase [900] collected in the recycle chamber [72] by sending the aqueous phase [900] to a mixer [10] via an aqueous recycle effluent pipe [94].

14. The solvent extraction process of claim 11, further comprising advancing the organic [800] and aqueous [900] phases to a downstream process by way of advance effluent pipes [80, 90].

15. The solvent extraction process of claim 11, further comprising adjusting the adjustable weir [66] at a single location utilizing means for controlling or adjusting [67].

16. The solvent extraction process of claim 11, wherein the organic launder [40] is operably connected to an isolated organic weir box [60], which is separate from the isolated aqueous weir box [70] and which is separated from the settling tank [30] by a wall [36], said isolated organic weir box [60] comprising a collection chamber [62], an advance chamber [64], and an adjustable weir [66] which separates the collection chamber [62] from the advance chamber [64].

17. The solvent extraction process of claim 11, wherein the organic launder [40] and the aqueous launder [50] are completely submerged in an organic phase [800] and an aqueous phase [900], respectively, during operation.

18. The solvent extraction process of claim 11, wherein the recycle chamber [72] of the isolated aqueous weir box [70] is operably connected to a mixer [10] via an outlet port [79] and an aqueous recycle effluent pipe [94].

19. The solvent extraction process of claim 11, wherein the organic launder [40] and the aqueous launder [50] extend across a width of the settling tank [30].

20. The solvent extraction process of claim 11, wherein at least one of the organic launder [140] and the aqueous launder [350] comprise a plurality of pipes [142, 352] having one or more perforations, apertures, or slits [144, 354] therein.

21. The solvent extraction process of claim 11, wherein the organic launder [240] comprises a weir [242] and the aqueous launder [250] comprises a pipe [252] having one or more perforations, apertures, or slits [254].

22. The solvent extraction process of claim 11, wherein said pipe [42, 52] comprises one or more bends [641, 651] or branches [643, 653].

23. The solvent extraction process of claim 11, wherein both of the organic launder [40] and the aqueous launder [50] comprise pipes [42, 52] having one or more perforations, apertures, or slits [44, 54] therein.

24. The solvent extraction process of claim 23, wherein said tubular cross-section comprises a rectangular or box shape.

* * * * *